UNITED STATES PATENT OFFICE.

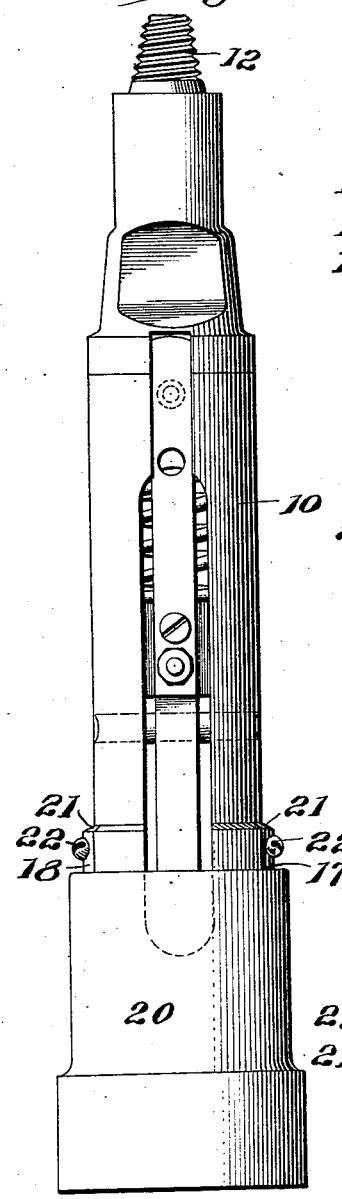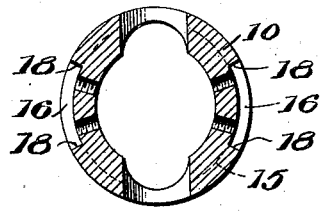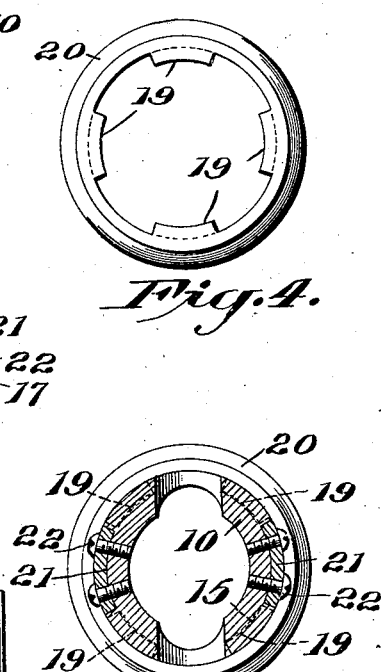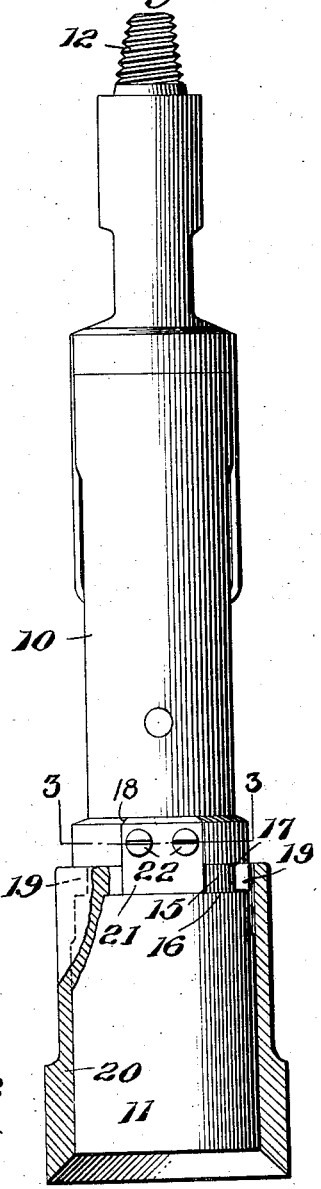

ROBERT V. McMULLEN, OF EUREKA, KANSAS, ASSIGNOR TO THE MIDLAND SUPPLY COMPANY, OF PAWHUSKA, OKLAHOMA, A CORPORATION OF OKLAHOMA.

FISHING TOOL.

1,417,616.        Specification of Letters Patent.     Patented May 30, 1922.

Application filed August 12, 1920. Serial No. 402,962.

*To all whom it may concern:*

Be it known that I, ROBERT V. McMULLEN, a citizen of the United States, residing at Eureka, in the county of Greenwood and State of Kansas, have invented certain new and useful Improvements in Fishing Tools; and I do hereby declare the following to be a full, clear, and exact description of the same, reference being had to the accompanying drawings, forming part of this specification.

This invention relates to tools commonly known as fishing tools utilized for recovering oil and gas well drilling implements lost in the well. Frequently two or three adjacent wells are of different diameter and it is not infrequent that the same well is of varying diameter as it is sunk in the earth. The greater portion of the cost of a fishing tool of this character is attributable to what is known as the socket, and to eliminate the purchase of various size fishing tools to fit wells of different diameters it is well known practice to provide a series of bowls of increasing diameters, any one of which can be secured to the socket of the fishing tool, depending on the size or diameter of the well. Ordinarily, the bowl is secured to the socket in such manner that the bowl itself is apt to become lost in the well and an object of the present invention is to provide a fishing tool wherein the liability of the bowl becoming detached from the socket and lost in the well is entirely eliminated.

In the accompanying drawings,—

Figure 1 is an elevation of a fishing tool embodying the present invention;

Fig. 2 is an elevation of the socket and bowl taken at right angles to Fig. 1, a portion of the bowl being broken away to show the means for securing the bowl on the socket;

Fig. 3 is a horizontal section of the socket taken on the line 3—3 in Fig. 2, the bowl being removed;

Fig. 4 is a top plan view of the bowl; and

Fig. 5 is a view similar to Fig. 3 with the bowl secured on the socket.

As shown in the drawings the socket consists generally of a hollow cylindrical body portion 10, a throat portion 11 at its lower end and a screw threaded projection 12 at its upper end for attachment of means for lowering the socket down into the well. The interior wall of the throat portion 11 is flared in accordance with usual practice, to guide the end of the tool lost in the well into the interior of the socket where it will be gripped by suitable gripping members as is well understood in the art.

Frequently, as stated before, the diameter of the socket is considerably less than that of the well, leaving an appreciable space between the exterior wall of the socket and the wall of the well into which the end of the lost tool may possibly enter instead of entering the socket. To overcome this difficulty without the necessity of keeping on hand a set of sockets of different sizes, bowls of varying diameters are adapted to be secured on the socket to increase the diameter of the latter at its lower end. This, however, has usually been done in such a manner that the bowl sometimes becomes detached by the shearing off of the locking means, usually bolts, and the bowl lost in the well. To avoid the loss of the bowl the present invention contemplates the provision of a bowl that can be removed only from the upper end of the socket, whereby the bowl cannot fall in the well should the locking means be broken.

To accomplish this result the socket is preferably formed with an enlarged lower end portion and a circumferentially or transversely extending slot 15 cut therein to form upwardly and downwardly facing shoulders 16, 17. A plurality of longitudinally extending slots 18 are also formed in the enlarged portion of the socket intermediate the slot 15 and the top of the enlarged portion to permit inwardly extending shoulders 19 on the interior of the bowl 20 to enter or pass downwardly therethrough into the slot 15. The distance between opposed projections or shoulders 19 on the bowl is a little greater than the diameter of the upper reduced portion of the socket but less than the enlarged portion of the socket and to mount the bowl on the socket it is necessary to pass the bowl down over the reduced portion. Projections 19 are alined with the entry slots 18 in placing the bowl on the socket and when the bowl reaches a position where said projections rest on shoulder 16 the bowl is partially rotated until the projections are positioned between the opposed shoulders 16, 17 where they are locked preferably by small curved plates 21 that are placed in the entry slots 18, said plates being of sufficient depth to extend down against shoulder 16 to completely close the entry slots. The locking plates are secured to the socket by any suitable fastening means, screws 22 being shown in the present instance, and prevent rotation of the bowl on the socket while shoulders 16 and 17 prevent relative longitudinal movement of the bowl and socket.

It is obvious that, should screws 22 be broken while the tool is in use nothing but possibly the plates 21 could be lost in the well because the distance between projections 19 on the bowl being less than the diameter of the shouldered portion of the socket, the bowl could not drop off.

Furthermore, the bowl is locked between shoulders 16, 17 and practically all vibrations set up in the bowl when the tool is in use are taken up by said shoulders, thus relieving screws 22 of a great deal of the shearing strains that are usually imposed on them.

What is claimed is:

1. A fishing tool comprising a socket having a cylindrical body portion, a shoulder extending around the exterior of said body portion adjacent one end thereof and a bowl adapted to be passed over the opposite end only of the body portion, the interior of said bowl having a shouldered portion of less diameter than the diameter of the shouldered body portion of the socket whereby said shoulder on the socket forms a stop for the bowl, and means on the socket spaced from said socket shoulder for locking the bowl against longitudinal movement on the socket.

2. A fishing tool comprising a socket having a cylindrical body portion, a shoulder extending around the exterior of said body portion adjacent one end thereof and a bowl adapted to be passed over the opposite end of the body portion, said bowl having a plurality of shoulders on its interior surface adapted to engage the shouldered portion of the socket and means for locking the bowl against the shouldered portion of the socket.

3. A fishing tool comprising a socket having oppositely disposed circumferentially extending shoulders on its exterior, one of said shoulders having a plurality of entry slots formed therein and a bowl having a plurality of projections on its interior wall adapted to be passed through said entry slots and positioned between the shoulders on the socket, and means removably secured to the body of the socket for closing said entry slots to lock the bowl on the socket.

4. A fishing tool comprising a socket having an enlarged lower end portion and a bowl, the interior diameter of said bowl being substantially equal to the diameter of the upper portion of the socket, but less than the diameter of said lower enlarged portion, whereby said bowl is normally removable from the upper end only of the socket, and means for locking said bowl on the socket.

5. A fishing tool comprising a socket and a bowl adapted to be removably secured at one end of the socket, said bowl being removable only from the opposite end of the socket, oppositely disposed circumferentially extending shoulders on one of said members, one of said shoulders having a plurality of entry slots formed therein, a plurality of projections on the other member adapted to be passed through said entry slots and positioned between the oppositely disposed shoulders, and means for locking the projections between said shoulders.

6. A fishing tool comprising a socket and a bowl adapted to be removably secured at one end of the socket, said bowl being removable only from the opposite end of the socket, oppositely disposed transversely extending shoulders on one of said members, and a plurality of projections on the other member adapted to be positioned between said oppositely disposed shoulders.

7. A fishing tool comprising a socket having a continuous circumferentially extending shoulder on its exterior adjacent one end thereof, a series of circumferentially extending shoulders on its exterior, the shoulders of said series being spaced from each other and from the continuous shoulder, and a bowl having a plurality of projections on its interior wall adapted to be locked between the continuous shoulder and the series of shoulders, whereby movement of the bowl longitudinally of the socket is prevented, said bowl being removable only from the opposite end of the socket.

8. A fishing tool comprising a socket having a continuous circumferentially extending shoulder on its exterior adjacent one end thereof, a series of circumferentially extending shoulders on the exterior of the socket spaced from each other and from the continuous shoulder, said continuous shoulder and the shoulders of the series being opposed to each other longitudinally of the socket, and a bowl adapted to be passed over the opposite end of the socket and having a plurality of projections on its interior wall adapted to be passed through between the shoulders of said series, the interior diameter of the shouldered portion of the bowl being less than the continuously shouldered end portion of the socket whereby removal of said bowl from the shouldered end portion of the socket is prevented.

9. A fishing tool comprising a socket and a bowl adapted to be removably secured at one end of the socket, said bowl being normally removable from the opposite end only of the socket, oppositely disposed transversely extending shoulders on the socket and a shouldered portion on the bowl adapted to seat between the shoulders on the socket when the parts are locked together.

ROBERT V. McMULLEN.